(12) United States Patent
Moynihan et al.

(10) Patent No.: US 9,143,227 B2
(45) Date of Patent: Sep. 22, 2015

(54) OPTICAL TRANSPORT NETWORK PORT PROTECTION SYSTEMS AND METHODS USING FLEXIBLE SWITCH CRITERIA

(75) Inventors: Jeffrey Scott Moynihan, Cumming, GA (US); John K. Oltman, Chamblee, GA (US); Trevor John Ibach, Manotick (CA); Trevor Donald Corkum, Hebbville (CA)

(73) Assignee: Ciena Corporation, Hanover, MD (US)

( * ) Notice: Subject to any disclaimer, the term of this patent is extended or adjusted under 35 U.S.C. 154(b) by 238 days.

(21) Appl. No.: 13/290,653

(22) Filed: Nov. 7, 2011

(65) Prior Publication Data

US 2013/0114953 A1 May 9, 2013

(51) Int. Cl.
*H04B 10/00* (2013.01)
*H04J 3/14* (2006.01)
*H04B 10/032* (2013.01)

(52) U.S. Cl.
CPC ............... *H04B 10/032* (2013.01); *H04J 3/14* (2013.01); *H04J 2203/006* (2013.01)

(58) Field of Classification Search
USPC ............................... 398/5; 370/221, 222, 223
See application file for complete search history.

(56) References Cited

U.S. PATENT DOCUMENTS

| 7,630,297 | B2 * | 12/2009 | Sestito et al. | 370/218 |
|---|---|---|---|---|
| 8,417,111 | B2 * | 4/2013 | Moynihan et al. | 398/1 |
| 8,433,190 | B2 * | 4/2013 | Wellbrock et al. | 398/2 |
| 2002/0191242 | A1 * | 12/2002 | Sommer et al. | 359/110 |
| 2003/0035411 | A1 | 2/2003 | Moy et al. | |
| 2004/0076114 | A1 * | 4/2004 | Miriello et al. | 370/222 |
| 2004/0208527 | A1 * | 10/2004 | Mantin et al. | 398/33 |
| 2007/0116061 | A1 | 5/2007 | Meagher et al. | |
| 2007/0292129 | A1 * | 12/2007 | Yan et al. | 398/5 |
| 2008/0279553 | A1 | 11/2008 | Meagher et al. | |
| 2009/0074404 | A1 * | 3/2009 | Suryaputra et al. | 398/5 |
| 2010/0040370 | A1 * | 2/2010 | Aoki et al. | 398/58 |
| 2010/0040378 | A1 * | 2/2010 | Koitabashi | 398/141 |
| 2010/0054731 | A1 * | 3/2010 | Oltman et al. | 398/1 |
| 2010/0272438 | A1 * | 10/2010 | Conklin et al. | 398/58 |
| 2011/0013911 | A1 | 1/2011 | Alexander et al. | |
| 2011/0103222 | A1 * | 5/2011 | Mutoh et al. | 370/228 |

(Continued)

OTHER PUBLICATIONS

Fujistu et al; The key benefits of OTN networks; 2010; Fujistu network communication Inc; pp. 1-8.*

(Continued)

*Primary Examiner* — Daniel Dobson
*Assistant Examiner* — Amritbir Sandhu
(74) *Attorney, Agent, or Firm* — Clements Bernard PLLC; Christopher L. Bernard; Lawrence A. Baratta, Jr.

(57) ABSTRACT

The present disclosure provides Optical Transport Network (OTN) port protection systems and methods using flexible switch criteria. Specifically, the OTN port protection systems and methods provide linear protection in OTN such as 1+1 Protection with Automatic Protection Switching (APS) and/ or 1+1 Subnetwork Connection Protection (SNCP) Protection. The OTN Port Protection with flexible switch criteria allows a user to provision a protection application on an OTN Port and select a switch criteria, Section Monitoring, Path Monitoring, or Tandem Connection Monitoring, without considering the provisioning state of an Optical channel Data Unit level k (ODUk) entity. The ODUk entity may either be cross-connected in the LO case or terminated in the HO case. The ODUk entity may be provisioned independently, after the port protection has been established.

20 Claims, 12 Drawing Sheets

(56) References Cited

U.S. PATENT DOCUMENTS

| | | | |
|---|---|---|---|
| 2011/0142438 A1* | 6/2011 | Youn et al. | 398/5 |
| 2012/0281523 A1* | 11/2012 | Huber et al. | 370/217 |
| 2013/0071117 A1* | 3/2013 | Pan et al. | 398/45 |
| 2013/0121685 A1* | 5/2013 | Rao et al. | 398/17 |
| 2013/0216215 A1* | 8/2013 | Chan et al. | 398/4 |
| 2013/0322867 A1* | 12/2013 | Ibach et al. | 398/2 |
| 2013/0343747 A1* | 12/2013 | Sarwar et al. | 398/25 |
| 2014/0086581 A1* | 3/2014 | Youn | 398/45 |
| 2014/0093235 A1* | 4/2014 | Gareau et al. | 398/25 |
| 2014/0146663 A1* | 5/2014 | Rao et al. | 370/228 |
| 2014/0169783 A1* | 6/2014 | Surek | 398/10 |
| 2014/0186019 A1* | 7/2014 | Chaudhary et al. | 398/1 |
| 2014/0193146 A1* | 7/2014 | Lanzone et al. | 398/2 |
| 2014/0233939 A1* | 8/2014 | Gruman et al. | 398/5 |
| 2014/0337668 A1* | 11/2014 | Huber et al. | 714/15 |
| 2015/0016815 A1* | 1/2015 | Maggiari et al. | 398/5 |

OTHER PUBLICATIONS

Steve Gorshe et al; A tutorial on ITU-T G.709 Optical Transport Network; 2010; Sierra Inc. pp. 1-78.*

Fujitsu et al;the key Benefits of OTN networks; 2010; Fujitsu network communications Inc; pp. 1-8.*

International Telecommunication Systems Union G.709/Y.1331—Series G: Transmission Systems and Media, Digital Systems and Networks ; Digital terminal equipments—General; Series Y: Global Information Infrastructure, Internet Protocol Aspects and Next-Generation Networks—Internet protocol aspects—Transport; Interfaces for the Optical Transport Network (OTN); Dec. 2009.

International Telecommunication Union B.798—Series G: Transmission Systems and Media, Digital Systems and Networks—Digital terminal equipment—Other terminal equipment—Characteristics of optical transport network hierarchy equipment functional blocks; Oct. 2010.

International Telecommunication Union G.873.1—Series G: Transmission Systems and Media, Digital Systems and Networks; Digital networks—Optical transport networks; Optical Transport Network (OTN): Linear protection; Jul. 2011.

International Telecommunication Union G.806—Series G: Transmission Systems and Media, Digital Systems and Networks; Digital networks—General aspects; Optical Transport Network (OTN): Linear protection; Jul. 2011.

* cited by examiner

| Protection Architecture | Switching Type | Protection subclass and Moni-toring | ODU Entities for protection switching, Individual / Group | APS channel used and MFAS in bit 6-8 | Server layer of protected entity | Protect-ion Switched entity | Trigger criteria used |
|---|---|---|---|---|---|---|---|
| 1+1 | unidir | SNC/I | Individual | no | one HO ODUk or one OTUk | ODUkP | ODU SSF/SSD |
| 1+1 | bidir | SNC/I | individual | 111 | one OTUk | ODUkP | ODU SSF/SSD |
| 1:n | bidir | SNC/I | individual | 111 | one OTUk | ODUkP | ODU SSF/SSD |
| 1+1 | unidir | SNC/N | individual | no | one or more HO ODUk and/or OTUk | ODUkP | ODU TSF/TSD |
| 1+1 | unidir | SNC/S | individual | no | one or more HO ODUk and/or OTUk | ODUkT | ODUkT SSF/SSD |
| 1+1 | bidir | SNC/S | individual | 001-110 | one or more HO ODUk and/or OTUk | ODUkT | ODUkT SSF/SSD |
| 1:n | bidir | SNC/S | individual | 001-110 | one or more HO ODUk and/or OTUk | ODUkT | ODUkT SSF/SSD |
| 1+1 | unidir | CL-SNCG/I | group | no | one HO ODUk | LO ODU | HO ODUkP SSF/SSD and HO ODUdPLM |
| 1+1 | bidir | CL-SNCG/I | group | HO 000 | one HO ODUk | LO ODU | HO ODUkP SSF/SSD and HO ODUdPLM |
| 1:1 | bidir | CL-SNCG/I | group | HO 000 | one HO ODUk | LO ODU | HO ODUkP SSF/SSD and HO ODUdPLM |
| 1+1 | unidir | CL-SNCG/S | group | no | one HO ODUk or OTUk | LO ODU | ODUkT SSF/SSD |
| 1+1 | bidir | CL-SNCG/S | group | 001-110 | one HO ODUk or OTUk | LO ODU | ODUkT SSF/SSD |
| 1:N | bidir | CL-SNCG/S | group | 001-110 | one HO ODUk or OTUk | LO ODU | ODUkT SSF/SSD |

Note 1 - bidir LO ODU SNC/I can not be supported over HO ODUk; reason is that there is only one HO ODUk Path APS channel and there are many LO ODUk signals. No sharing of one APS channel by multiple protection switching instances is defined.

Note 2 - Bidir SNC/N, is not supported because it requires the transport of an APS signal between the Headend and the Tail end. This APS signal is to be inserted on the ODUk signal which may contain AIS OCI or LCK signal. This ODUk AIS/OCI/LCK signal with APS cannot be distinguished from a ODUk AIS/OCI/LCK signal without APS inserted at an intermediate point of the protection connection at the Tail-end. It is recommended to use 1+1 Bidir SNC/S instead.

Note 3 - CL-SNCG/I can assign all signal to the Na subgroup and leave the Nb subgroup empty.

*FIG. 4*

OPTICAL TRANSPORT NETWORK PORT PROTECTION SYSTEMS AND METHODS USING FLEXIBLE SWITCH CRITERIA

FIELD OF THE INVENTION

The present disclosure relates generally to optical networking. More particularly, the present disclosure relates to Optical Transport Network (OTN) port protection systems and methods using flexible switch criteria for linear OTN port protection.

BACKGROUND OF THE INVENTION

The Optical Transport Network (OTN), defined in inter alia ITU G.709/Y.1331 (December 2009) "Interfaces for the Optical Transport Network (OTN)," the contents of which are herein incorporated by reference, allows network operators to converge networks through seamless transport of the numerous types of legacy protocols while providing the flexibility required to support future client protocols. In OTN networks, protection occurs by switching Low Order Optical channel Data Unit (ODU) entities. Conventionally, linear protection in OTN, e.g. as defined in recommendation ITU-T G.873.1 (July 2011) "Optical Transport network—Linear protection," the contents of which are herein incorporated by, requires a user to change switch criteria based on ODU connection state, either a Low Order (LO) ODUk cross connection or a High Order (HO) ODUk termination with LO ODUj cross connections. The LO ODUk connection may utilize either the sub-network connection protection with inherent monitoring (SNC/I) Optical channel Transport Unit-k Section Monitoring (OTUk-SM) layer, the subnetwork connection protection with non intrusive monitoring (SNC/N) ODUk-Path Monitoring (PM), or the subnetwork connection protection with sublayer monitoring (SNC/S) ODUk-Tandem Connection Monitoring (TCMi) layer termination for switch criteria. However, the HO ODUk termination with LO ODUj cross connections may only utilize the Compound link based SNC group protection with inherent monitoring (CL-SNCG/I) ODUk-PM layer for switch criteria. This prevents the use of a common ODUk-TCMi layer switch criteria between HO ODUk and LO ODUk provisioning. The provisioning state of the ODUk, LO versus HO, limits the ODUk protection switch criteria available to the user and prevents a generic OTN Port Protection application.

BRIEF SUMMARY OF THE INVENTION

In various exemplary embodiments, an Optical Transport Network (OTN) port protection method includes provisioning a working port and a protection port between two OTN network elements, the working port and the protection port providing linear OTN protection therebetween; selecting a switch criteria based on received data between the working port and the protection port; and automatically setting up a switch mode for the two OTN network elements based on the selected switch criteria. The linear OTN protection may include Subnetwork Connection Protection with and without an Automatic Protection Switching protocol. The switch criteria may include one of Section Monitoring, Path Monitoring, and Tandem Connection Monitoring. The OTN port protection method may further include, if the switch criteria is Section Monitoring, automatically selecting a Subnetwork connection protection with inherent monitoring to protect a Connection Termination Point; if the switch criteria is Path Monitoring, automatically selecting a Compound Link Sub-network connection protection Group with inherent monitoring to protect a Trail Termination Point; and if the switch criteria is Tandem Connection Monitoring, automatically selecting a Subnetwork connection protection with sublayer monitoring to protect a Connection Termination Point or a Trail Termination Point.

The OTN port protection method may further include selecting the switch criteria between the working port and the protection port regardless of a provisioning state of an associated Optical channel Data Unit level k (ODUk) entity, the ODUk entity is one of cross connected in a Low Order case and terminated in a High Order case. The OTN port protection method may further include independently provisioning the ODUk entity one of before and after establishing port protection. The OTN port protection method may further include changing the ODUk entity associated with the working port and the protection port from one of a termination to a cross connection and a cross connection to a termination while maintaining the linear OTN Protection in a same configuration. The switch criteria may include one of Path Monitoring and Tandem Connection Monitoring, and wherein the switch criteria may be utilized for both Low Order cross connections and High Order termination with Low Order cross connections. The OTN port protection method may further include transparently providing overhead for the Path Monitoring and the Tandem Connection Monitoring through one or more intermediate nodes between the two OTN network elements.

The linear OTN protection may include an Automatic Protection Switching protocol, and the method may further include provisioning the linear OTN protection independently of traffic on the working port; if the traffic is provisioned prior to provisioning the linear OTN protection, configuring the working port with the provisioned traffic, configuring the protection port with no connections and objects disposed thereon, and upon creating a protection group, automatically creating all objects existing on the working port are on the protection port; and if the linear OTN protection is provisioned prior to the traffic, for each Connection Termination Point and Trail Termination Point created on the working port, automatically creating matching objects on the protection port. The linear OTN protection may include Subnetwork Connection Protection, and the method may further include selecting one of Path Monitoring and Tandem Connection Monitoring for the switch criteria, the switch criteria utilized for a plurality of modules at the two OTN network elements; and automatically creating Subnetwork Connection Protection groups when a protected path is created between the two OTN network elements. The OTN port protection method may further include utilizing a control plane operating between the two OTN network elements; and provisioning via the control plane an Optical channel Data Unit level k (ODUk) entity after the linear OTN protection is provisioned.

In another exemplary embodiment, an Optical Transport Network (OTN) network includes a first OTN network element; a second OTN network element communicatively coupled to the first network element; and an interface to the first OTN network element and the second OTN network element; wherein the interface is configured to receive provisioning data for a working port and a protection port between the first OTN network element and the second OTN network element, the working port and the protection port providing linear OTN protection therebetween, and to receive a switch criteria between the working port and the protection port; wherein the first OTN network element and the second OTN network element are configured to provision the linear OTN protection based on the provisioning data and the switch criteria; and wherein the first OTN network element and the second OTN network element are automatically configured to set up a switch mode based on the switch criteria. The linear OTN protection may include Subnetwork Connection Protection with and without an Automatic Protection Switching protocol. The switch criteria may include one of Section Monitoring, Path Monitoring, and Tandem Connection Monitoring.

If the switch criteria is Section Monitoring, the first OTN network element and the second OTN network element may be configured to automatically select a Subnetwork connection protection with inherent monitoring to protect a Connection Termination Point; if the switch criteria is Path Monitoring, the first OTN network element and the second OTN network element may be configured to automatically select a Compound Link Subnetwork connection protection Group with inherent monitoring to protect a Trail Termination Point; and if the switch criteria is Tandem Connection Monitoring, the first OTN network element and the second OTN network element may be configured to automatically select a Subnetwork connection protection with sublayer monitoring to protect a Connection Termination Point or a Trail Termination Point. The OTN network may further include at least one intermediate node between the first OTN network element and the second OTN network element, wherein overhead for the Path Monitoring and the Tandem Connection Monitoring is transparently provided through at least one intermediate node. The switch criteria may include one of Path Monitoring and Tandem Connection Monitoring, and wherein the switch criteria may be utilized for both Low Order cross connections and High Order termination with Low Order cross connections. The OTN network may further include a control plane operating between the first OTN network element and the second OTN network element, wherein the control plane is configured to provision an Optical channel Data Unit level k (ODUk) entity on the working port after the linear OTN protection is provisioned.

In yet another exemplary embodiment, an Optical Transport Network (OTN) network element includes a plurality of ports configured to switch OTN connections therebetween; and a controller communicatively coupled to the plurality of ports; wherein the controller is configured to provision a working port and a protection port between the first OTN network element and the second OTN network element based on a user request, the working port and the protection port providing linear OTN protection therebetween; determine a switch criteria between the working port and the protection port based on the user request; and automatically set up a switch mode based on the selected switch criteria.

BRIEF DESCRIPTION OF THE DRAWINGS

Exemplary and non-limiting embodiments of the present disclosure are illustrated and described herein with reference to the various drawings, in which like reference numbers denote like method steps and/or system components, respectively, and in which:

FIG. 4 is a table of linear OTN protection architectures and related monitoring using the OTN port protection systems and methods;

DETAILED DESCRIPTION OF THE INVENTION

Figure 1:
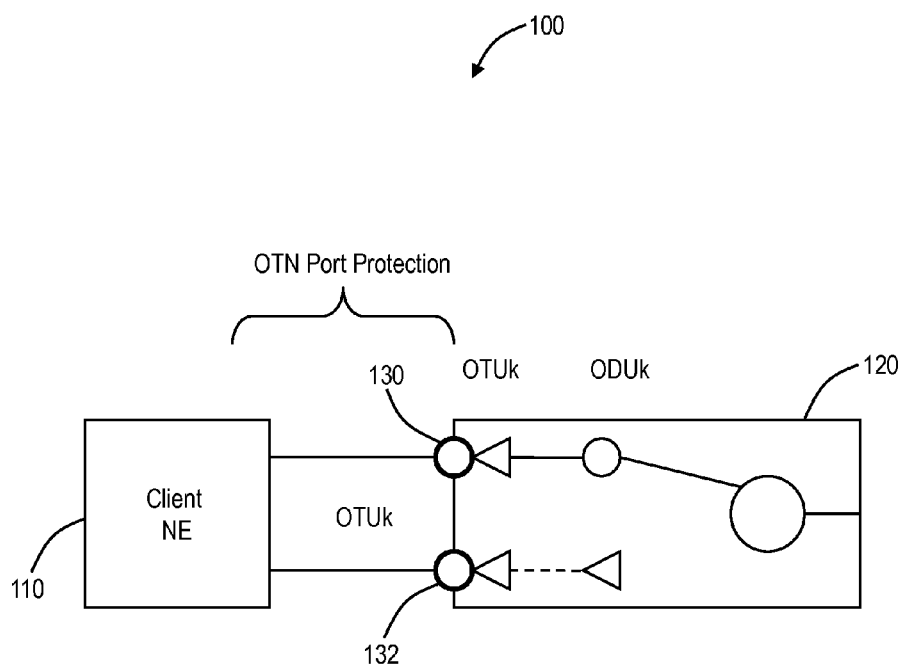
FIG. 1 is a diagram of port protection between a client and an OTN network element.

In various exemplary embodiments, the present invention relates to OTN port protection systems and methods using flexible switch criteria. In the following description, the following abbreviations are used:

| | |
|---|---|
| AID | Access Identifier |
| AIS | Alarm Indication Signal |
| APS | Automatic Protection Switching |
| CL-SNCG/I | Compound link based SNC group protection with inherent monitoring |
| CL-SNCG/S | Compound link based SNC group protection with sublayer monitoring |
| CTAG | Correlation Tag |
| CTP | Connection Termination Point |
| FDI | Forward Defect Indication |
| FTTP | Floating Trail Termination Point |
| LO | Low Order |
| HO | High Order |
| OCI | Open Connection Indication |
| ODUk | Optical channel Data Unit level k (k = 1, 2, 3, 4, . . . ) |
| OTUk | Optical channel Transport Unit level k (k = 1, 2, 3, 4, . . . ) |
| OTN | Optical Transport Network |
| PCC | Protection Communication Channel |
| PM | Path Monitoring |
| PTP | Physical/Path Termination Point |
| SD | Signal Degrade |
| SF | Signal Fail |
| SSD | Server Signal Degraded |
| SSF | Server Signal Fail |
| SM | Section Monitoring |
| SNC/I | Subnetwork connection protection with inherent monitoring |
| SNC/N | Subnetwork connection protection with non-intrusive monitoring |
| SNC/S | Subnetwork connection protection with sublayer monitoring |
| SNCG/I | Compound Link Subnetwork connection protection Group with inherent monitoring |
| SNCG/S | Compound Link Subnetwork connection protection Group with sublayer monitoring |
| SNCP | Subnetwork connection protection |
| TCMi | Tandem Connection Monitoring (i = 1 . . . 6) |
| TSD | Trail Signal Degraded |
| TSF | Trail Signal Fail |
| TTP | Trail Termination Point |
| WDM | Wavelength Division Multiplexing |

In the OTN port protection systems and methods, 1+1 protection generically means that traffic is bridged at a traffic head end and is switched at a tail end. 1+1 protection with APS means that automatic protection signaling is used to negotiate a switch protocol between two nodes in the network. In OTN, APS signaling is carried in the APS bytes which align with the ODU PM or ODU TCM overhead. 1+1 protection with APS is intended to protect a single span in the network, and 1+1 APS protection may span multiple nodes through the network so long as ODU PM or ODU TCM overhead is transparent through intermediate nodes. The OTN port protection systems and methods provide port protection with flexible switch criteria. The OTN Port Protection with Flexible Switch Criteria allows a user to provision a protection application on an OTN Port and select a switch criteria, OTUk-SM, ODUk-PM, or ODUk-TCMi, without considering the provisioning state of the ODUk entity. The ODUk entity may either be cross-connected in the LO case or terminated in the HO case. Advantageously, 1+1 Protection with APS may be provisioned independently of traffic connections. For example, if connections are provisioned before 1+1 protection with APS is provisioned, all connections can be provisioned on what will become the Working line and no connections or ODU TTP objects can be provisioned on what will become the Protection line. When the protection group is created, the Protection line will automatically create all objects which exist within the Working line. If 1+1 protection with APS is provisioned before connections, when an ODU CTP (or ODU TTP) is created within the Working line, a matching ODU CTP (or ODU TTP) will automatically be created within the Protection line.

The ODUk entity may be provisioned independently, after the port protection has been established. This is specifically needed in the OTN Control Plane application; where OTN Control Plane Lines are crossing OTN Protection Lines. The provisioning state of the ODUk entity changes depending on the SNC rate; an ODUk SNC would need a LO ODUk cross connection, whereas a ODUj SNC would need a HO ODUk termination. In order to provide a generic OTN Port Protection application with flexible switch criteria on an OTN interface, the ODUk-PM layer or ODUk-TCMi layer switch criteria is used for both a LO ODUk cross connections and a HO ODUk termination with LO ODUj cross connections. The OTN port protection systems and methods allow the ODUk entity of an OTN protected interface to be changed from a termination to a cross connection or from a cross connection to a termination without affecting the OTN Protection application. The OTN port protection systems and methods also allow the OTN protection to be configured identically in all cases; with LO ODUk cross connections or with HO ODUk terminations.

Referring to FIG. 1, in an exemplary embodiment, a diagram illustrates OTN port protection 100 between a client 110 and an OTN network element 120. The client 110 may include any OTN device transmitting/receiving an OTUk signal with OTN port protection on ports 130, 132. For example, the client 110 may include, without limitation, an OTN network element, an optical switch, a cross-connect, a router/switch, a WDM device, and the like. The OTN network element 120 may also include any OTN device transmitting/receiving the OTUk signal with OTN port protection on ports 130, 132. The OTN port protection systems and methods include APS on the ports 130, 132. In order to maintain a port protection option for OTN similar to SONET/SDH APS, OTN Protection modes may be combined to provide similar functionality. Specifically, the OTN port protection systems and methods allow a user to protect all CTP entities on the port 130, 132 by allowing the user to choose a switch criteria based on the OTUk-SM or the highest layer ODUk-PM/TCMi. The system (i.e. the client 110 and/or the network element 120) then sets up the necessary SNC/I, SNCG/I, SNCG/S, or SNC/S protection modes on the port. The ports 130, 132 need not be configured in the same OTN structure to be part of a Protection Group. However, the protection times may be increased if the ports 130, 132 do not have an identical OTN structure. Of note, the OTN port protection systems and methods are implemented in hardware, software, and/or firmware associated with the ports 130, 132, and it is assumed the ports 130, 132 each have compatible configurations.

Protection switching between the ports 130, 132 occurs based on the detection of certain defects on the transport entities (working and protection) within the protected domain. For example, OTN defects are described in ITU-T G.806 (January 2009) "Characteristics of transport equipment—Description methodology and generic functionality" and G.798 (October 2010) "Characteristics of optical transport network hierarchy equipment functional blocks," the contents of each are incorporated herein by reference. Based on monitoring of the ports 130, 132, the ports 130, 132 may have no defect, SD, or SF. As described herein, the monitoring methods include inherent, non-intrusive, and sublayer. With inherent, protection switching is triggered by defects detected at the ODUk link connection (e.g., server layer trail and server/ODUk adaptation function). The trail termination sink of an OTUk[V] or ODUkP server layer provides the TSF and TSD protection switching criteria via the OTUk[V]/ODUk_A or ODUkP/ODU[i]j_A functions (SSF and SSD). No defect detection is performed at the ODUk layer itself. It can be used for individual and for compound link group protection (CL_SNCG/I). In contrast to SDH SNC/I, ODUk SNC/I can stretch only a single link connection, as the FDI defect resulting from further upstream server layer defects is not detected in the server/ODUk adaptation function. The limitation to a single server layer trail for SNC/I protection is given by the use of SD as protection switching criteria. SD is only available from the OTUk[V] or HO ODUk trail that is locally terminated and not from further upstream OTUk[V] or HO ODUk trails. In an exemplary embodiment, the OTN port protection systems and methods utilize TCMi SNC/I to enable multiple link connections.

With non-intrusive, protection switching is triggered by a non-intrusive monitor of the ODUkP trail or ODUkT sublayers trails at the tail end of the protection group. For a SNC/N protection, the switch criteria according to ITU-T G.798 is utilized. This ensures that ODUk-AIS as well a Locked or OCI condition is contributing to switch criteria of a ODU SNC/N protection. With sublayer, protection switching is triggered by defects detected at the ODUkT sublayer trail (TCM). An ODUkT sublayer trail is established for each working and protection entity. Protection switching is therefore triggered only on defects of the protected domain. Any of the protection switching criteria may be used, as long as it can be given (OK, SD, SF) information for the transport entities within the protected domain. Some monitors or network layers may not have an SD detection method. Where this is the case, there is no need to use a different APS protocol—it would simply happen that an SD would not be issued from an equipment that cannot detect it. Where an APS protocol is used, the implementation should not preclude that the far end declares an SD over the APS channel, even if the monitor at the near end cannot detect SD.

Figure 2:
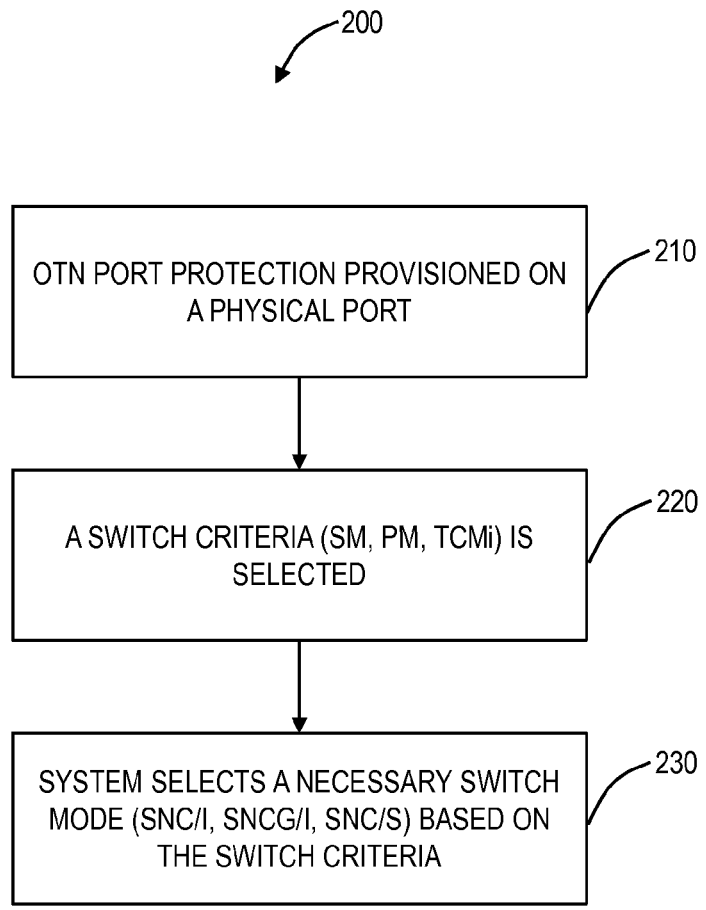
FIG. 2 is a flowchart of an OTN port protection method.

Referring to FIG. 2, in an exemplary embodiment, a flowchart illustrates an OTN port protection method 200. OTN port protection is provisioned on a physical port, by a user (step 210). Provisioning may be performed through any of a Network Management System (NMS), Element Management System (EMS), craft interface, Transaction Language-1 (TL1), a control plane (ASON, GMPLS, etc.), and the like. A switch criteria (SM, PM, or TCMi) is selected, by a user (step 220). As described herein, the switch criteria determines what is monitored for associated protection switching of OTN ports, i.e. Section, Path, or Tandem Connection. A necessary switch mode (e.g., SNC/I, SNCG/I, SNC/S) is selected automatically, by the system, based on the selected switch criteria (step 230). As described herein, the OTN port protection method 200 allows the user to provision a protection application on an OTN Port and select a switch criteria, OTUk-SM, ODUk-PM, or ODUk-TCMi, without considering the provisioning state of the ODUk entity. The ODUk entity may either be cross-connected in the LO case or terminated in the HO case. Importantly, the ODUk entity may be provisioned independently, after the port protection has been established. This is required control plane applications where OTN Control Plane Lines are crossing OTN Protection Lines. The provisioning state of the ODUk entity changes depending on the SNC rate; an ODUk SNC would need a LO ODUk cross connection, whereas a ODUj SNC would need a HO ODUk termination. As described herein, the OTN port protection method 200 enables an OTN port protection (similar to SONET/SDH ADS, and consistent with G.873/1) application with a flexible switch criteria on an OTN interface. The ODUk-PM layer or ODUk-TCMi layer switch criteria is used for both a LO ODUk cross connections and a HO ODUk termination with LO ODUj cross connections.

Figure 3A:
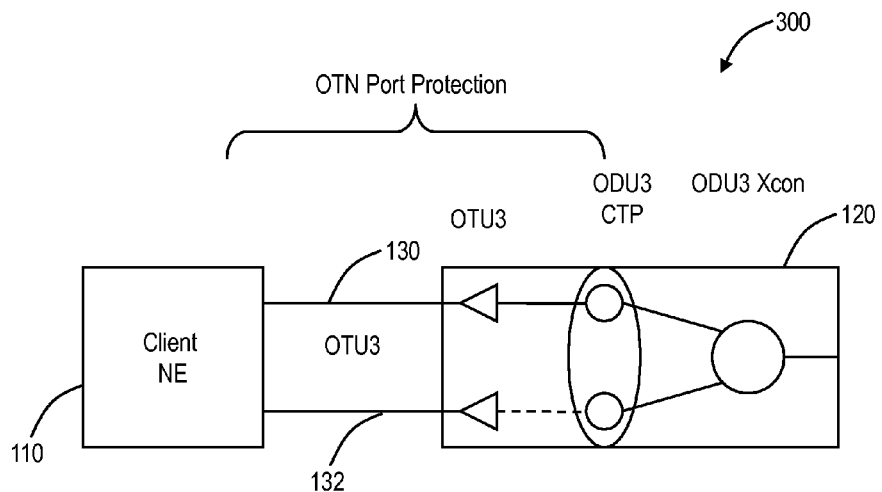
FIGS. 3A, 3B, 3C, and 3D are various diagram of OTN port protection between a client and an OTN network element.
Figure 3B:
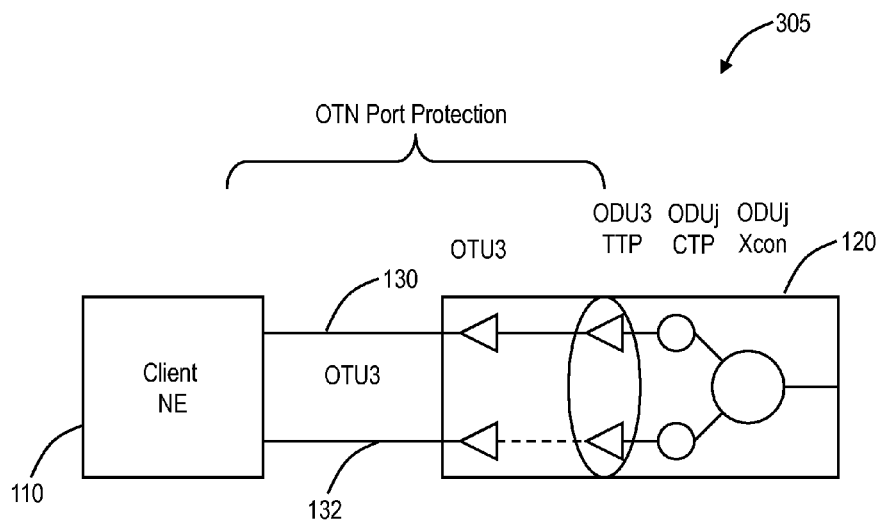
Figure 3C:
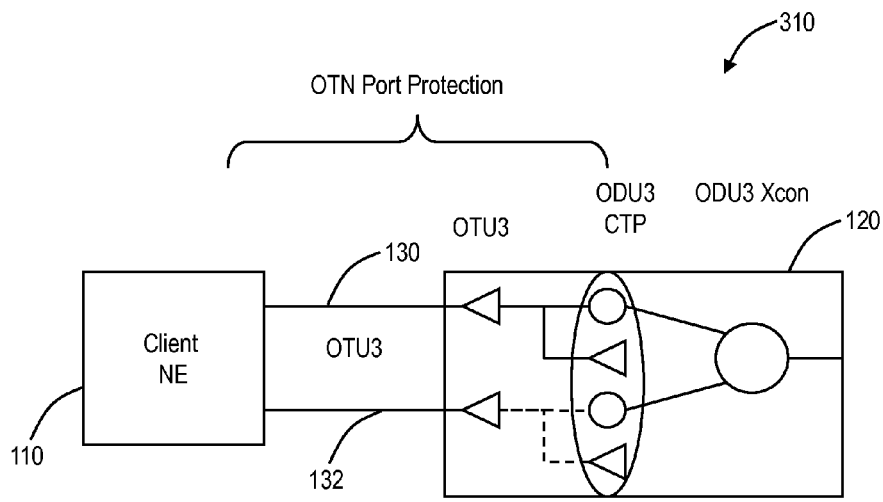
Figure 3D:
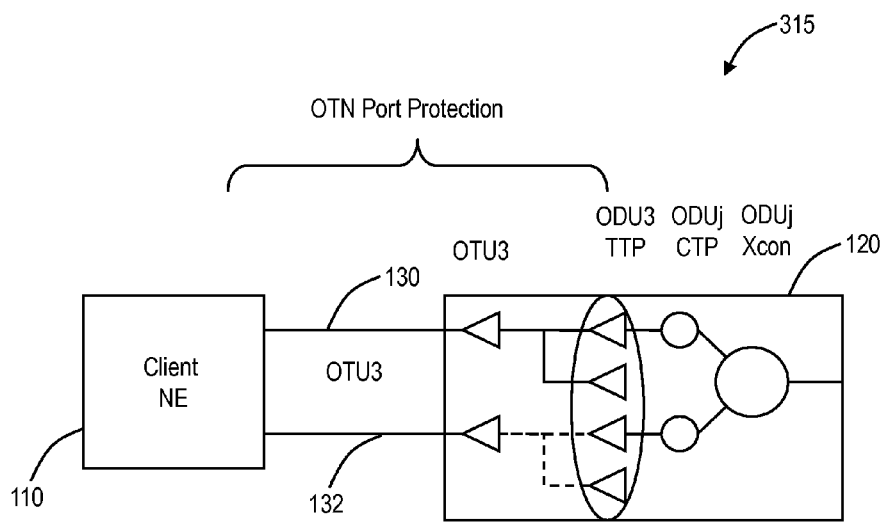

Referring to FIGS. 3A, 3B, 3C, and 3D, in various exemplary embodiments, various diagram illustrate OTN port protection 300, 305, 310, 315 between a client 110 and an OTN network element 120. Each of the port protections 300, 305, 310, 315 are illustrated with OTU3/ODU3 on the ports 130, 132, but those of ordinary skill in the art will appreciate the port protection contemplates OTUk/ODUk where k=1, 2, 3, 4, . . . . As described in the OTN port protection method 200, OTN port protection may be provisioned on the physical port and the criteria (SM, PM, TCMi) chosen by the user. The network elements 120 then setups the necessary switch mode (SNC/I, SNCG/I, SNC/S) depending on the switch criteria. In FIG. 3A, the port protection 300 includes a switch criteria of OTUk-SM, and the network element 120 selects an ODU SNC/I to protect an ODUk CTP. In FIG. 3B, the port protection 305 includes a switch criteria of ODUk-PM, and the network element 120 selects an ODU SNCG/I to protect an ODUk TTP. The port protection 305 operates port protection using the ODUk-PM layer APS/PCC channel and defects. In FIG. 3C, the port protection 310 includes a switch criteria of ODUk-TCMi, and the network element 120 selects an ODU SNC/S to protect an ODUk CTP. The port protection 310 operates as Line Level protection using the ODUk-TCMi layer APS/PCC channel and TCMi defects. In FIG. 3D, the port protection 315 includes a switch criteria of ODUk-TCMi, and the network element 120 selects an ODU SNC/S to protect an ODUk TTP (note, this is a proprietary mode). The port protection 315 operates as Line Level protection using the ODUk-TCMi layer APS/PCC channel and TCMi defects. This mode may be considered as a combination of SNC/I and SNCG/I using the SNC/S switch criteria.

Referring to FIG. 4, in an exemplary embodiment, a table illustrates linear OTN protection architectures and related monitoring using the OTN port protection systems and methods. Of note, the table of FIG. 4 is similar to Table 7.1 in G.873.1 with additional architectures as described herein. The table provides information of the possible supported protection architectures versus the related supporting switching types, APS channel used, related server layers, and protected entities. Of note, G.873.1 includes ODUk compound link subnetwork connection group protection with inherent monitoring. The standard only identifies the ODU-PM layer monitoring for switch criteria. The G.873.1 standard does not list the ODU-TCMi layer monitoring for switch criteria whereas the OTN port protection systems and methods do contemplate use of the ODU-TCMi layer for switch criteria. Further, the G.873.1 standard requires the user to change the switch criteria based on the ODU connection state, i.e. either a LO ODUk connection or a HO ODUk termination with LO ODUj connections. The LO ODUk connection may utilize either the SNC/N ODUk-PM layer or the SNC/S ODUk-TCMi layer termination for switch criteria. However, the HO ODUk termination with LO ODUj connections may only utilize the CL-SNCG/I ODUk-PM layer for switch criteria. Accordingly, in order to provide flexible switch criteria on an OTN interface with a HO ODUk termination with LO ODUj connections (last three rows in the table of FIG. 4), the CL-SNCG/S Protection Subclass and Monitoring is utilized by the OTN port protection systems and methods.

Referring to FIGS. 5-9, in various exemplary embodiments, network diagrams of a network 400 illustrate exemplary 1+1 protection with APS 405, 410, 415 and 1+1 SNCP protection 420, 425 using the OTN port protection systems and methods. The network 400 includes two interconnected OTN network elements 500a, 500b with a working line 505 and a protection line 510 therebetween. The network elements 500a, 500b include various slots with cards disposed therein and the cards communicatively coupled therebetween. For example, the network elements 500a, 500b may include optical cards 520 (labeled in this example as 40 G card slot disposed in slots x and x+2), OTN cross connect interface (XCIF) cards 525 (disposed in slots x+1 and x+3), and a cross connect 530. The optical card 520 may include a plurality of ports, y. Those of ordinary skill in the art will recognize the network elements 500a, 500b may include other components which are omitted for simplicity, and that the OTN port protection systems and methods described herein are contemplated for use with a plurality of different network elements with the network elements 500a, 500b presented as an exemplary type of network element. For example, the functionality of the optical cards 520, the XCIF cards 525, and/or the cross connect 530 may be combined in a single card or distributed in various other permutations.

With respect to editing, editing any provisioning parameters involves editing the Protection Group, i.e. a Protection Group object identifier (e.g., AID in TL1) is specifically used to edit these parameters. The Protection Group may be retrieved via either the Protection Group object identifier or the object identifier of the Working or Protection members. Alarms/Events are generated against the Protection Group, e.g. Protection Switch Complete. User protection switches are requested against members of the Protection Group, i.e. request is to switch away from the member or to lock it out.

Figure 5:
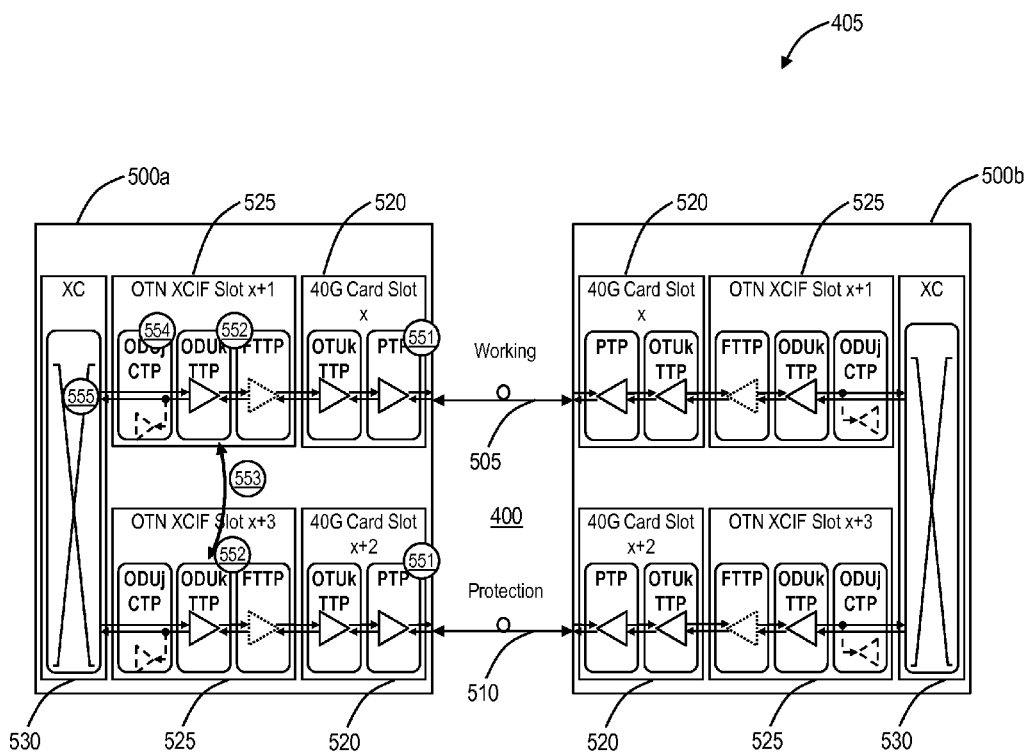
FIG. 5 is a network diagram of 1+1 protection with APS illustrating an example of ODUk TTP Protection using ODUk TTP APS.

In FIG. 5, the 1+1 protection with APS 405 illustrates an example of ODUk TTP Protection using ODUk TTP APS. On the network elements 500a, 500b, the working line 505 is slot x+1, port y, ODUk TTP, and the protection line 510 is slot x+3, port y, ODUk TTP. A setup of the 1+1 protection with APS 405 with the OTN port protection systems and methods is illustrated in FIG. 5 as steps 551-555. First, PTPs are created on the working line 505 and the protection line 510 (step 551). Next, ODUk TTPs are created on the working line 505 and the protection line 510 (step 552). Subsequently, a protection group is created using ODUk TTPs (step 553). An ODUj CTP is created on the working line 505 (step 554). Finally, a connection is created using ODUk CTP on the working line 505 (step 555). When the ODUk CTP is created on the working line 505, the 1+1 protection with APS 405 will automatically create the corresponding ODUk CTP on the protection line 510.

Figure 6:
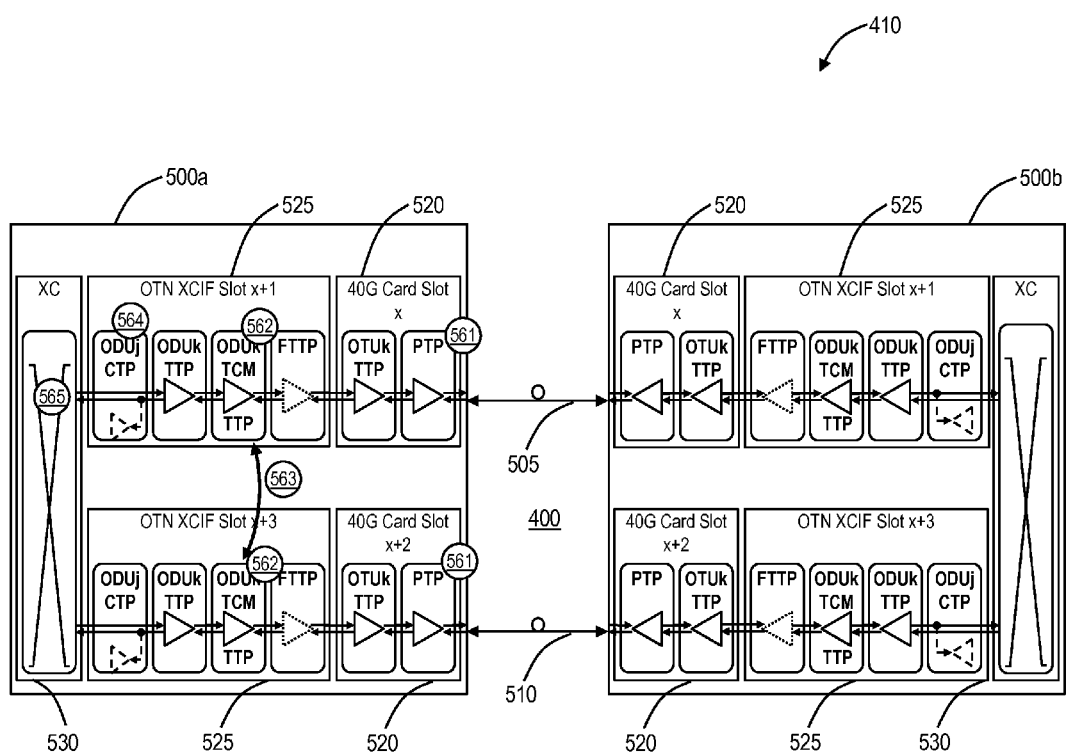
FIG. 6 is a network diagram of 1+1 protection with APS illustrating an example of ODUk TTP Protection using ODUk TCM APS.

In FIG. 6, the 1+1 protection with APS 410 illustrates an example of ODUk TTP Protection using ODUk TCM APS. On the network elements 500a, 500b, the working line 505 is slot x+1, port y, ODUk TCM TTP, and the protection line 510 is slot x+3, port y, ODUk TCM TTP. A setup of the 1+1 protection with APS 410 with the OTN port protection systems and methods is illustrated in FIG. 6 as steps 561-565. First, PTPs are created on the working line 505 and the protection line 510 (step 561). ODUk TCM TTPs are created on the working line 505 and the protection line 510 for creation of the protection group (step 562). Next, a protection group is created using ODUk TCM TTPs (step 563). An ODUj CTP is created on the working line 505 (step 564). Finally, a connection may be created using ODUj CTP on the working line 505 (step 565). When the ODUk CTP is created on the working line 505, the 1+1 protection with APS 405 will automatically create the corresponding ODUk CTP on the protection line 510.

Figure 7:
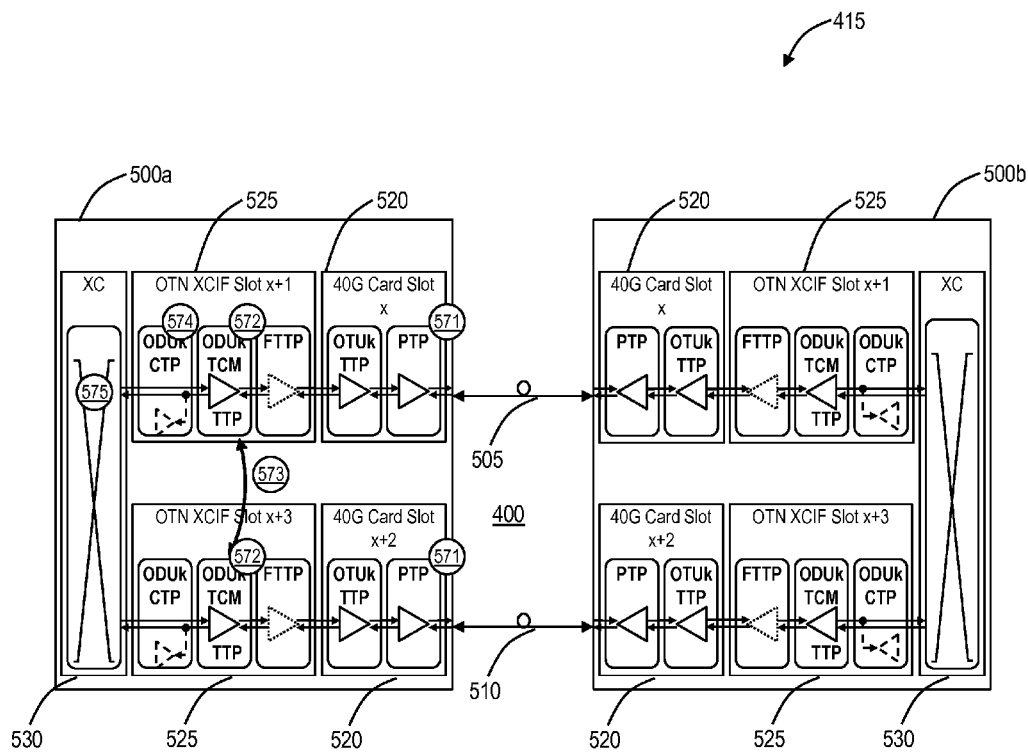
FIG. 7 is a network diagram of 1+1 protection with APS illustrating an example of ODUk CTP Protection using ODUk TCM APS.

In FIG. 7, the 1+1 protection with APS 415 illustrates an example of ODUk CTP Protection using ODUk TCM APS. On the network elements 500a, 500b, the working line 505 is slot x+1, port y, ODUk TCM TTP, and the protection line 510 is slot x+3, port y, ODUk TCM TTP. A setup of the 1+1 protection with APS 415 with the OTN port protection systems and methods is illustrated in FIG. 7 as steps 571-575. PTPs are created on the working line 505 and the protection line 510 (step 571). ODUk TCM TTPs are created on the working line 505 and the protection line 510 for creation of the protection group (step 572). A protection group is created using ODUk TCM TTPs (step 573). An ODUk CTP is created on the working line 505 (step 574). Finally, a connection is created using ODUk CTP on the working line 505 (step 575). When the ODUk CTP is created on the working line 505, the 1+1 protection with APS 405 will automatically create the corresponding ODUk CTP on the protection line 510.

Figure 8:
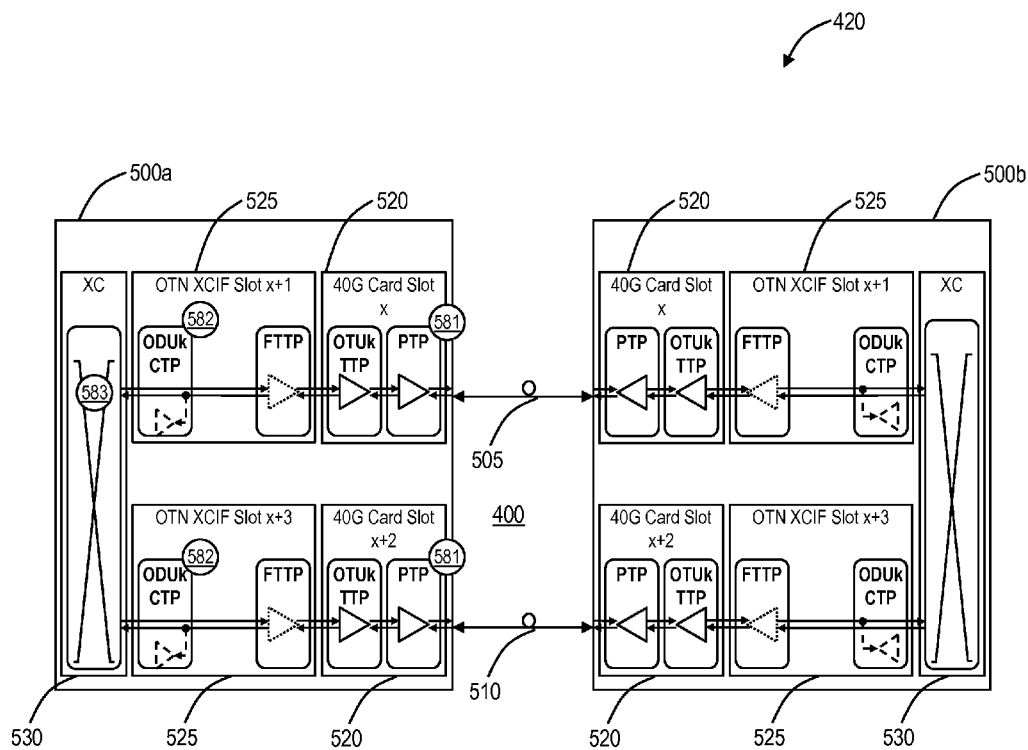
FIG. 8 is a network diagram of 1+1 SNCP protection illustrating an example of ODUk CTP Protection using ODUk CTP Path Status.
Figure 9:
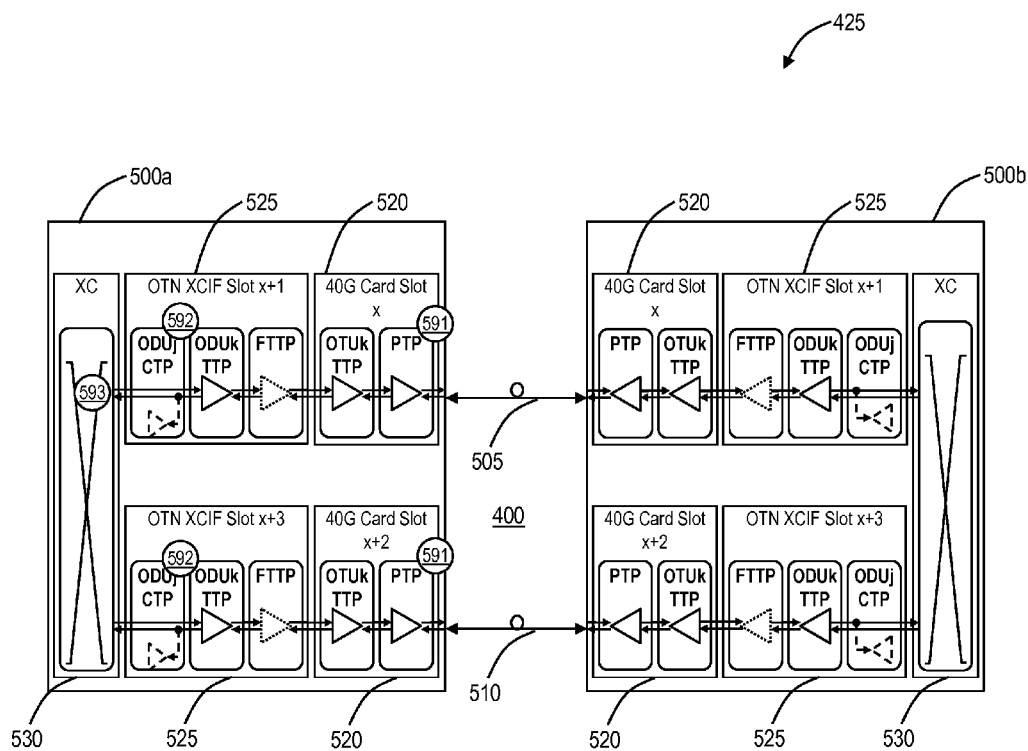
FIG. 9 is a network diagram of 1+1 SNCP protection illustrating an example of ODUj CTP Protection using ODUj CTP Path Status.

In FIGS. 8 and 9, the 1+1 SNCP protection 420, 425 does not use APS signaling to negotiate a protection switch between the network elements 500a, 500b. Traffic is bridged at the head end and switched at the tail end due to path status. Path Status may be monitored via the ODU PM path or ODU TCM path status. ODU PM path status versus ODU TCM path status may be selected either at the SNCP protection group level or at the Shelf level and applies for all SNCP protection groups on the shelf (or network element). SNCP Protection groups may be automatically created when a path protected connection is created.

In FIG. 8, the 1+1 SNCP protection 420 illustrates an example of ODUk CTP Protection using ODUk CTP Path Status. On the network elements 500a, 500b, the working line 505 is slot x+1, port y, ODUk CTP, and the protection line 510 is slot x+3, port y, ODUk CTP. A setup of the 1+1 SNCP protection 420 with the OTN port protection systems and methods is illustrated in FIG. 8 as steps 581-583. PTPs are created on the working path 505 and the protection path 510 (step 581). An ODUk CTP is created for the working path 505 and the protection path 510 (step 582). A connection is created using both the working and protection ODUk CTPs (step 583).

In FIG. 9, the 1+1 SNCP protection 425 illustrates an example of ODUj CTP Protection using ODUj CTP Path Status. On the network elements 500a, 500b, the working line 505 is slot x+1, port y, ODUj CTP, and the protection line 510 is slot x+3, port y, ODUj CTP. A setup of the 1+1 SNCP protection 425 with the OTN port protection systems and methods is illustrated in FIG. 9 as steps 591-593. PTPs are created on the working path 505 and the protection path 510 (step 591). An ODUj CTP is created for the working path 505 and the protection path 510 (step 592). A connection is created using both working and protection ODUj CTPs (step 593).

Figure 10:
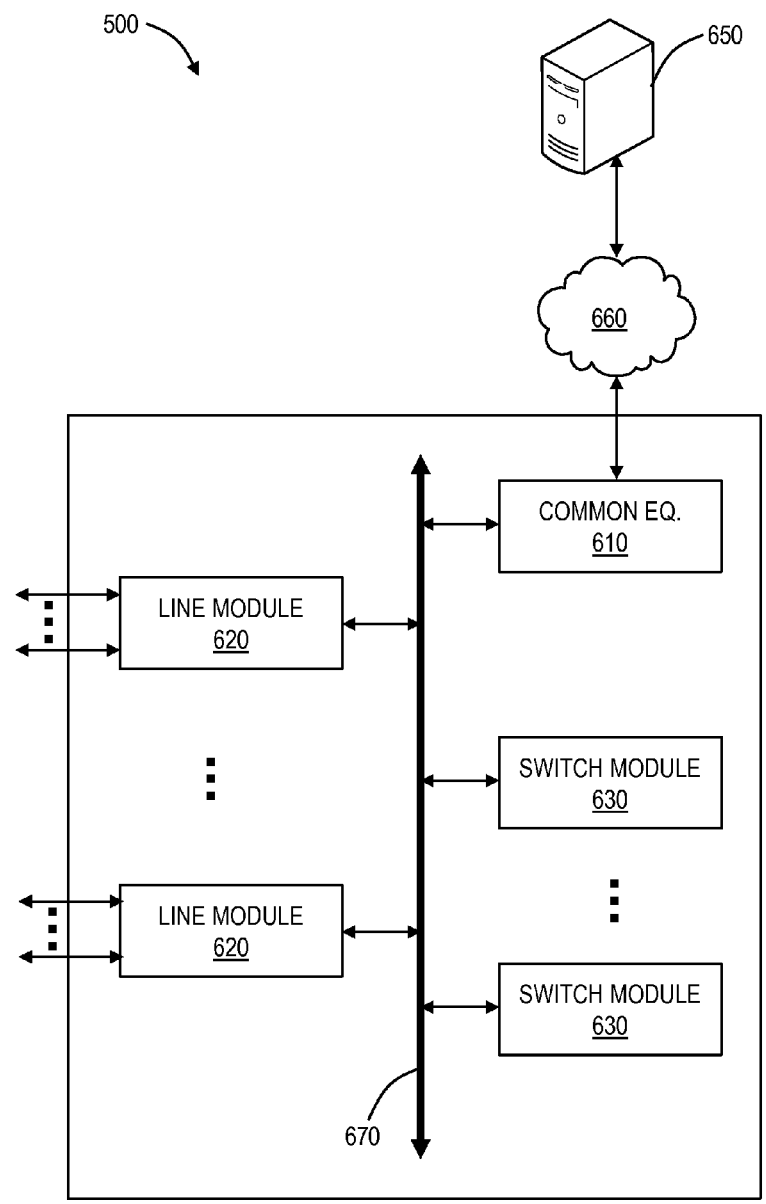
FIG. 10 is a block diagram of an exemplary optical network element.

Referring to FIG. 10, in an exemplary embodiment, a block diagram illustrates an exemplary optical network element 500 for the OTN port protection systems and methods. In an exemplary embodiment, the network element 500 is a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 600 may include an OTN add/drop multiplexer, a multi-service provisioning platform (MSPP), a digital cross-connect (DCS), etc. In an exemplary embodiment, the network element 500 includes common equipment 610, one or more line modules 620, and one or more switch modules 630. The common equipment 610 may include power; a control module; operations, administration, maintenance, and provisioning (OAM&P) access; and the like. The common equipment 610 may connect to a management system 650 through a data communication network 660. The management system 650 may include a network management system (NMS), element management system (EMS), or the like. Additionally, the common equipment 610 may include a control plane processor configured to operate a control plane and the systems and methods described herein.

The network element 500 may include an interface 670 for communicatively coupling the common equipment 610, the line modules 620, and the switch modules 630 therebetween. For example, the interface 670 may include a backplane, mid-plane, a bus, optical or electrical connectors, or the like. The line modules 620 are configured to provide ingress and egress to the switch modules 630, and are configured to provide interfaces for OTN port protection as described herein. In an exemplary embodiment, the line modules 620 may form ingress and egress switches with the switch modules 630 as center stage switches for a three-stage switch, e.g. a three stage Clos switch. The line modules 620 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 620 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 620 may include DWDM interfaces, short reach interfaces, and the like, and may connect to other line modules 620 on remote NEs, end clients, the edge routers, and the like. From a logical perspective, the line modules 620 provide ingress and egress ports to the network element 500, and each line module 620 may include one or more physical ports.

The switch modules 630 are configured to switch services between the line modules 620. For example, the switch modules 630 may provide wavelength granularity (Layer 0 switching), SONET/SDH granularity such as Synchronous Transport Signal-1 (STS-1), Synchronous Transport Module level 1 (STM-1), Virtual Container 3(VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 1006 may include both Time Division Multiplexed (TDM) (i.e., circuit switching) and packet switching engines. The switch modules 630 may include redundancy as well, such as 1:1, 1:N, etc. Those of ordinary skill in the art will recognize the network element 500 may include other components which are omitted for simplicity, and that the systems and methods described herein are contemplated for use with a plurality of different network elements with the network element 500 presented as an exemplary type of network element. For example, in another exemplary embodiment, the network element 500 may not include the switch modules 630, but rather have the corresponding functionality in the line modules 620 (or some equivalent) in a distributed fashion. For the network element 500, other architectures providing ingress, egress, and switching therebetween are also contemplated for the systems and methods described herein. In an exemplary embodiment, the OTN port protection systems and methods contemplate use with the network element 500.

Figure 11:
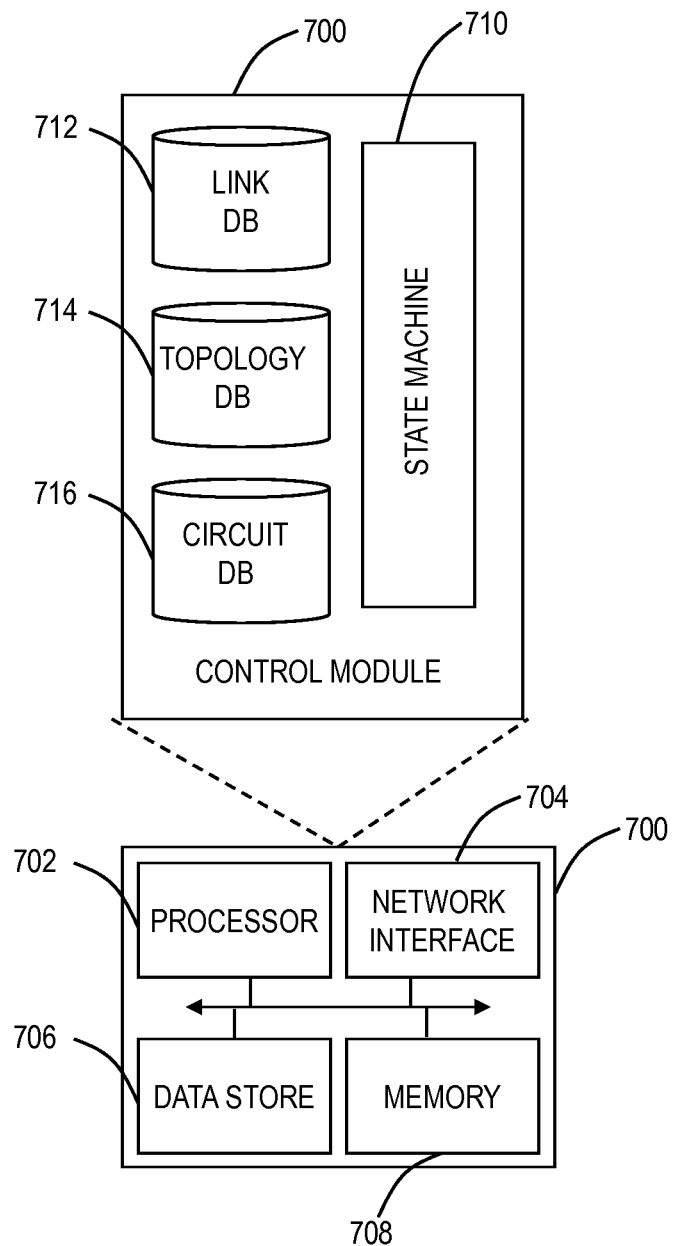
FIG. 11 is a block diagram of an exemplary control module.

Referring to FIG. 11, in an exemplary embodiment, a block diagram illustrates a control module 700 to provide control plane processing and/or OAM&P for a node such as the network element 500. The control module 700 may be part of common equipment, such as common equipment 610 in the network element 500. The control module 700 may include a processor 702 which is hardware device for executing software instructions such as operating the control plane. The processor 702 may be any custom made or commercially available processor, a central processing unit (CPU), an auxiliary processor among several processors associated with the control module 700, a semiconductor-based microprocessor (in the form of a microchip or chip set), or generally any device for executing software instructions. When the control module 700 is in operation, the processor 702 is configured to execute software stored within memory, to communicate data to and from the memory, and to generally control operations of the control module 700 pursuant to the software instructions. In an exemplary embodiment, the OTN port protection systems and methods contemplate use with the control module 700.

The control module 700 may also include a network interface 704, a data store 706, memory 708, and the like, all of which are communicatively coupled therebetween and with the processor 702. The network interface 704 may be used to enable the control module 700 to communicate on a network, such as to communicate control plane information to other control modules, to the management system 660, and the like. The network interface 704 may include, for example, an Ethernet card (e.g., 10BaseT, Fast Ethernet, Gigabit Ethernet) or a wireless local area network (WLAN) card (e.g., 802.11a/b/g). The network interface 704 may include address, control, and/or data connections to enable appropriate communications on the network. The data store 706 may be used to store data, such as control plane information, provisioning data, OAM&P data, etc. The data store 706 may include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 706 may incorporate electronic, magnetic, optical, and/or other types of storage media. The memory 708 may include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 708 may incorporate electronic, magnetic, optical, and/or other types of storage media. Note that the memory 708 may have a distributed architecture, where various components are situated remotely from one another, but may be accessed by the processor 702.

From a logical perspective, the control module 700 may include a state machine 710, a link database (DB) 712, a topology DB 714, and a circuit DB 716. The control module 700 may be responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet another exemplary embodiment, the control plane may utilize Optical Signaling and Routing Protocol (OSRP) from Ciena Corporation of Linthicum, MD which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween.

The state machine 710 may be configured to implement the behaviors described herein. The DBs 712, 714, 716 may be stored in the memory 708 and/or the data store 706. The link DB 712 includes updated information related to each link in a network including delay D, T1, T2, for example. The topology DB 714 includes updated information related to the network topology, and the circuit DB 716 includes a listing of terminating circuits and transiting circuits at the network element 500 where the control module 700 is located. The control module 700 may utilize control plane mechanisms to maintain the DBs 712, 714, 716. For example, HELLO messages may be used to discover and verify neighboring ports, nodes, protection bundles, boundary links, and the like. Also, the DBs 712, 714, 716 may share topology state messages to exchange information to maintain identical data. Collectively, the state machine 710 and the DBs 712, 714, 716 may be utilized to advertise topology information, capacity availability, provide connection management (provisioning and restoration), and the like. Each link in a network may have various attributes associated with it such as, for example, line protection, available capacity, total capacity, administrative weight, protection bundle identification, delay, designation of boundary link, and the like. The state machine 710 and the DBs 712, 714, 716 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the control module 700 is configured to communicate to other control modules 700 in other nodes on the network. This communication may be either in-band or out-of-band. For SONET networks and similarly for SDH networks, the control module 700 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T G.709 are in-band side channels used to carry transmission management and signaling information within Optical Transport Network elements. The GCC channels include GCC0 and GCC1/2. GCC0 are two bytes within OTUk overhead that are terminated at every 3R (Re-shaping, Re-timing, Re-amplification) point. GCC1/2 are four bytes (i.e. each of GCC1 and GCC2 include two bytes) within ODUk overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An Optical Transport Network (OTN) port protection method, comprising:
    provisioning a working port and a protection port between two OTN network elements, the working port and the protection port providing linear OTN protection therebetween;
    selecting one or more switch criteria based on received data between the working port and the protection port, wherein the switch criteria include Section Monitoring, Path Monitoring, and Tandem Connection Monitoring in OTN overhead on the working port monitored for associated protection switching, and wherein, when selected as switch criteria, the Path Monitoring and the Tandem Connection Monitoring are configured as transparent through intermediate nodes; and
    automatically setting up a switch mode for the two OTN network elements based on the selected switch criteria;
    wherein the linear OTN protection comprises Subnetwork Connection Protection with and without an Automatic Protection Switching protocol.

2. The OTN port protection method of claim 1, further comprising: if the switch criteria is Section Monitoring, automatically selecting a Subnetwork connection protection with inherent monitoring to protect a Connection Termination Point; if the switch criteria is Path Monitoring, automatically selecting a Compound Link Subnetwork connection protection Group with inherent monitoring to protect a Trail Termination Point; and if the switch criteria is Tandem Connection Monitoring, automatically selecting a Subnetwork connection protection with sublayer monitoring to protect a Connection Termination Point or a Trail Termination Point.

3. The OTN port protection method of claim 1, further comprising:
    selecting the switch criteria between the working port and the protection port regardless of a provisioning state of an associated Optical Channel Data Unit level k (ODUk) entity, wherein the ODUk entity is one of cross connected in a Low Order case and terminated in a High Order case.

4. The OTN port protection method of claim 3, further comprising:
    independently provisioning the ODUk entity one of before and after establishing port protection.

5. The OTN port protection method of claim 3, further comprising:
    changing the ODUk entity associated with the working port and the protection port from one of a termination to a cross connection and a cross connection to a termination while maintaining the linear OTN Protection in a same configuration.

6. The OTN port protection method of claim 3, wherein the switch criteria comprises one of Path Monitoring and Tandem Connection Monitoring, and wherein the switch criteria is utilized for both Low Order cross connections and High Order termination with Low Order cross connections.

7. The OTN port protection method of claim 6, further comprising:
    transparently providing overhead for the Path Monitoring and the Tandem Connection Monitoring through one or more intermediate nodes between the two OTN network elements.

8. The OTN port protection method of claim 1, wherein the linear OTN protection comprises an Automatic Protection Switching protocol, and further comprising:
    provisioning the linear OTN protection independently of traffic on the working port;
    if the traffic is provisioned prior to provisioning the linear OTN protection, configuring the working port with the provisioned traffic, configuring the protection port with no connections and objects disposed thereon, and upon creating a protection group, automatically creating all objects existing on the working port are on the protection port; and
    if the linear OTN protection is provisioned prior to the traffic, for each Connection Termination Point and Trail Termination Point created on the working port, automatically creating matching objects on the protection port.

9. The OTN port protection method of claim 1, wherein the linear OTN protection comprises Subnetwork Connection Protection, and further comprising:
    selecting one of Path Monitoring and Tandem Connection Monitoring for the switch criteria, the switch criteria utilized for a plurality of modules at the two OTN network elements; and
    automatically creating Subnetwork Connection Protection groups when a protected path is created between the two OTN network elements.

10. The OTN port protection method of claim 1, further comprising:
    utilizing a control plane operating between the two OTN network elements; and
    provisioning via the control plane an Optical channel Data Unit level k (ODUk) entity after the linear OTN protection is provisioned.

11. The OTN port protection method of claim 1, wherein at least one connection associated with the working port and the protection port between the two OTN network elements includes a change between a Low Order Optical channel Data Unit level k (ODUk) cross connect and a High Order ODUk termination.

12. The OTN port protection method of claim 1, wherein the automatically setting up a switch mode includes setting a mode which includes one of subnetwork connection protection with inherent monitoring (SNC/I), Compound Link Subnetwork connection protection Group with inherent monitoring (SNCG/I), and Subnetwork connection protection with sublayer monitoring (SNC/S).

13. The OTN port protection method of claim 12, wherein the SNC/I is used to protect an Optical channel Data Unit level k (ODUk) Connection Termination Point (CTP), the SNCG/I is used to protect an ODUk Trail Termination Point (TTP), and the SNC/S is used to protect an ODUk CTP.

14. An Optical Transport Network (OTN) network, comprising:
   a first OTN network element;
   a second OTN network element communicatively coupled to the first OTN network element; and
   an interface to the first OTN network element and the second OTN network element;
   wherein the interface is configured to receive provisioning data for a working port and a protection port between the first OTN network element and the second OTN network element, the working port and the protection port providing linear OTN protection therebetween, and to receive one or more switch criteria between the working port and the protection port, wherein the switch criteria include Section Monitoring, Path Monitoring, and Tandem Connection Monitoring in OTN overhead on the working port monitored for associated protection switching, and wherein, when selected as switch criteria, the Path Monitoring and the Tandem Connection Monitoring are configured as transparent through intermediate nodes;
   wherein the first OTN network element and the second OTN network element are configured to provision the linear OTN protection based on the provisioning data and the switch criteria;
   wherein the first OTN network element and the second OTN network element are automatically configured to set up a switch mode based on the switch criteria; and
   wherein the linear OTN protection comprises Subnetwork Connection Protection with and without an Automatic Protection Switching protocol.

15. The OTN network of claim 14, wherein:
   if the switch criteria is Section Monitoring, the first OTN network element and the second OTN network element are configured to automatically select a Subnetwork connection protection with inherent monitoring to protect a Connection Termination Point;
   if the switch criteria is Path Monitoring, the first OTN network element and the second OTN network element are configured to automatically select a Compound Link Subnetwork connection protection Group with inherent monitoring to protect a Trail Termination Point; and
   if the switch criteria is Tandem Connection Monitoring, the first OTN network element and the second OTN network element are configured to automatically select a Subnetwork connection protection with sublayer monitoring to protect a Connection Termination Point or a Trail Termination Point.

16. The OTN network of claim 14, further comprising:
   at least one intermediate node between the first OTN network element and the second OTN network element, wherein overhead for the Path Monitoring and the Tandem Connection Monitoring is transparently provided through at least one intermediate node.

17. The OTN network of claim 14, wherein the switch criteria comprises one of Path Monitoring and Tandem Connection Monitoring, and wherein the switch criteria is utilized for both Low Order cross connections and High Order termination with Low Order cross connections.

18. The OTN network of claim 14, further comprising:
   a control plane operating between the first OTN network element and the second OTN network element, wherein the control plane is configured to provision an Optical channel Data Unit level k (ODUk) entity on the working port after the linear OTN protection is provisioned.

19. The OTN network of claim 14, wherein at least one connection associated with the working port and the protection port includes a change between a Low Order Optical channel Data Unit level k (ODUk) cross connect and a High Order ODUk termination.

20. An Optical Transport Network (OTN) network element, comprising:
   a plurality of ports configured to switch OTN connections therebetween; and
   a controller communicatively coupled to the plurality of ports;
   wherein the controller is configured to:
   provision a working port and a protection port between a first OTN network element and a second OTN network element based on a user request, the working port and the protection port providing linear OTN protection therebetween;
   determine one or more switch criteria between the working port and the protection port based on the user request, wherein the switch criteria include Section Monitoring, Path Monitoring, and Tandem Connection Monitoring in OTN overhead on the working port monitored for associated protection switching, and wherein, when selected as switch criteria, the Path Monitoring and the Tandem Connection Monitoring are configured as transparent through intermediate nodes; and
   automatically set up a switch mode based on the selected switch criteria;
   wherein the linear OTN protection comprises Subnetwork Connection Protection with and without an Automatic Protection Switching protocol.

* * * * *